United States Patent [19]

Tsai

[11] 4,218,719
[45] Aug. 19, 1980

[54] REVERSE POWER FLOW DETECTOR AND CONTROL CIRCUIT

[75] Inventor: Reysen Tsai, Houston, Tex.
[73] Assignee: General Electric Company
[21] Appl. No.: 939,713
[22] Filed: Sep. 5, 1978

Related U.S. Application Data

[63] Continuation of Ser. No. 427,511, Dec. 26, 1973, Pat. No. 4,121,271.

[51] Int. Cl.² ............................................. H02H 3/38
[52] U.S. Cl. .......................................... 361/82; 361/84
[58] Field of Search ....................... 361/82, 84, 79, 77; 307/127, 232; 324/83 D, 83 R

[56] References Cited
U.S. PATENT DOCUMENTS

| | | | |
|---|---|---|---|
| 3,518,491 | 6/1970 | Downs | 361/82 |
| 3,525,904 | 8/1970 | Ringstad | 361/82 |

Primary Examiner—Patrick R. Salce
Attorney, Agent, or Firm—Francis X. Doyle

[57] ABSTRACT

A solid state, reverse power flow detector and control circuit which samples the line voltage and current, once each cycle. The voltage sampling circuit includes a pulse generator providing a voltage pulse of short duration at a given time or phase angle in each cycle. The voltage signals are applied to an SCR through a gate operated by the current signals. In one embodiment, the gate comprises a single transistor. With forward or no current, the gate does not allow the voltage signals to reach the SCR. When current reverses, the gate allows the voltage signals to trigger the SCR. The SCR turns on a transistor energizing a relay, after a brief delay. The relay acts to set the regulator or other device in power reverse condition. When current again is forward, the relay is deenergized and the device returned to the forward condition.

6 Claims, 2 Drawing Figures

REVERSE POWER FLOW DETECTOR AND CONTROL CIRCUIT

This application is a continuation of Ser. No. 427,511, filed Dec. 26, 1973; now U.S. Pat. No. 4,121,271.

BACKGROUND OF THE INVENTION

This invention relates to a reverse power flow detector and more particularly to a solid state reverse power flow detector and control circuit.

Present day reverse power flow detectors make use of relay type devices, which, in general lack sensitivity and do not provide desired maintenance free life. It has been considered necessary in the electrical energy field to provide a more sensitive reverse power flow detector for use in the multiple application of electrical energy present in the field today. Further, it has been seen as a necessity in the electrical energy field to provide a reverse power flow detector and control circuit which would be able to function over long periods of time without requiring extensive attention or maintenance.

Therefore, it is one object of this invention to provide a reverse power flow detector which will be responsive to small increments of reverse power flow.

A further object of this invention is to provide a reverse power flow detector which will require little maintenance and have a long life.

A still further object of this invention is to provide a reverse power flow detector which utilizes substantially solid state components.

SUMMARY OF INVENTION

Briefly, in one form, this invention comprises a voltage sampling circuit in the form of a pulse generator and a current sampling circuit. The pulse generator provides an output pulse of short duration at a given time during each cycle. The current signal is used to actuate a gate, allowing the voltage pulses to trigger an SCR whenever the current reverses. The SCR actuates a relay device, through a delay circuit to control an electrical device, placing such device in a power reverse condition.

The invention which is sought to be protected will be particularly pointed out and distinctly claimed in the claims appended hereto. However, it is believed that this invention and the manner in which its various objects and advantages are obtained as well as other objects and advantages thereof will be more fully understood from reference to the following detailed description of a preferred embodiment thereof, particularly when considered in the light of the accompanying drawing.

BRIEF DESCRIPTION OF DRAWING

FIG. 1 is a schematic diagram of a preferred form of solid state reverse power flow detector and control circuit according to this invention;

FIG. 2 shows a preferred form of switching control means to switch an electrical device from power forward to power reverse condition according to this invention.

DESCRIPTION OF PREFERRED EMBODIMENT

Figures 1, 2:
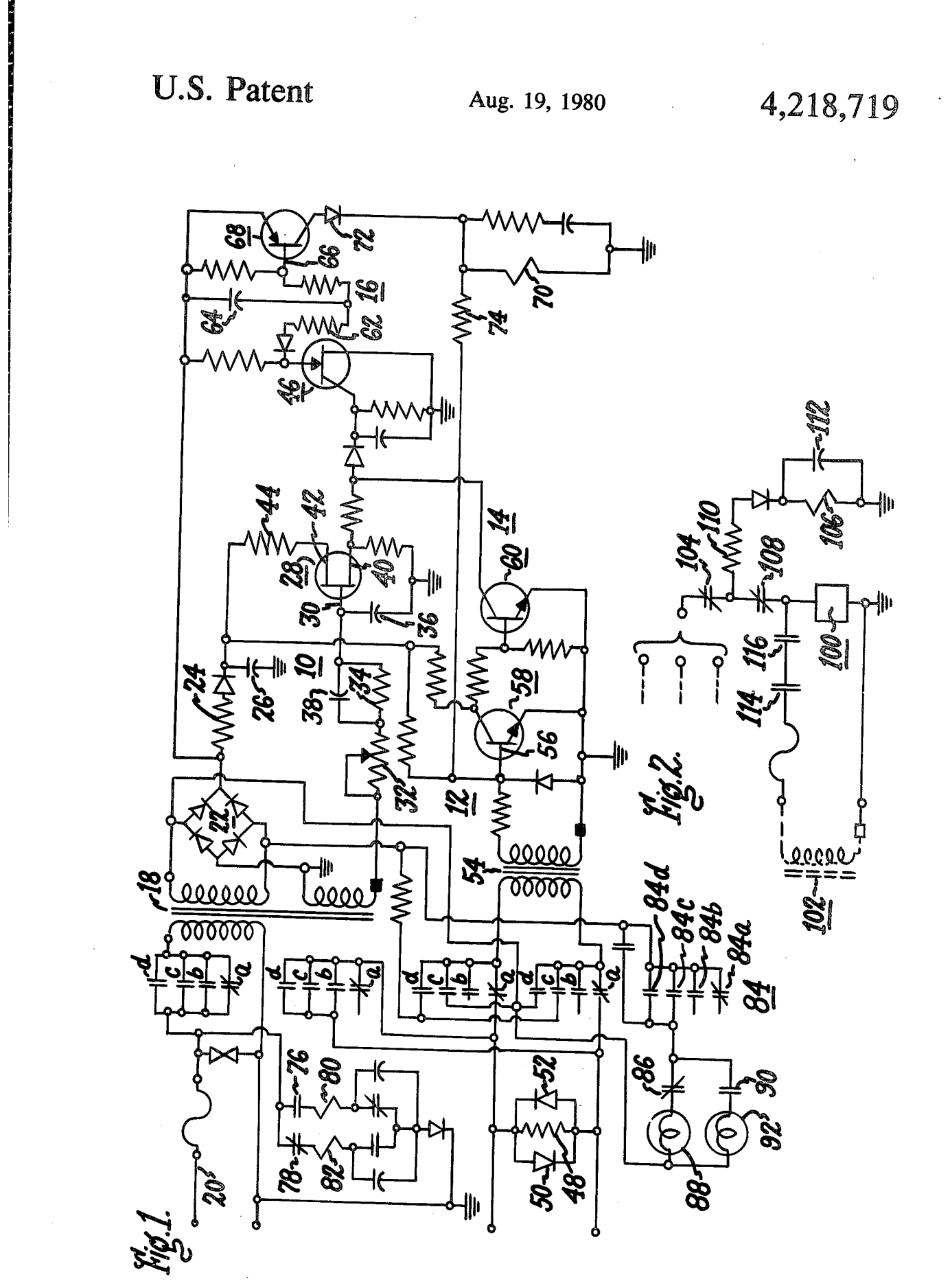

FIG. 1 shows a schematic diagram of a reverse power flow detector which, essentially, makes use of solid state components. The operation of the reverse power flow detector is based on the relationship of the voltage and current signals obtained from the monitored line. As is well known, the current signal is always positive with forward power flow and always negative with reverse power flow between the 73 degree and the 148 degree intervals of the voltage signal. (See for example U.S. Pat. No. 3,518,491.) This relationship is true for all power factors between 0.3 lagging and 0.85 leading. The reverse power flow detector of this invention samples the current during the 73 degree to 148 degree interval, determines its polarity and thus determines the direction of power flow in the monitored line. The reverse power flow detector will operate over the greatest range of power factors if the sampling is done at 90 degrees.

Referring now to FIG. 1, the schematic diagram of the preferred form of this invention shows a reverse power flow detector which includes a voltage sampling circuit, generally indicated as 10, a current sampling circuit generally indicated as 12, a signal gate circuit indicated as 14 and an output circuit, indicated as 16. The voltage sampling circuit comprises a transformer 18 which is connected to the line 20 to be monitored. Transformer 18 isolates the voltage sampling circuit 10 and provides the voltage for the DC supply and the voltage sampling circuit. DC power for all stages of the reverse power flow detector is developed by means of a bridge rectifier 22, control resistor 24 and a filter capacitor 26 connected as shown to a secondary winding of the transformer 18.

The voltage sampling circuit 10 includes a voltage reference pulse generator 28, which is a unijunction transistor, for generating a voltage reference signal. The emitter 30 of unijunction transistor 28 is connected to the line 20 through another winding of transformer 18. One pulse per cycle is obtained from the unijunction transistor 28. The pulse is obtained during the half cycle when voltage of emitter 30 is positive with respect to the circuit ground. The time during the half cycle in which the pulse is obtained is determined by the time constant of the integrator circuit consisting of resistors 32, 34 and the capacitor 36. A second capacitor 38 may be connected in parallel relation with the resistor 32 to shift the phase of the voltage applied to emitter 30 of unijunction transistor 28. This makes it easier to obtain a voltage reference pulse at 90 degrees of the line voltage.

The pulse obtained from base one 40 of the unijunction transistor 28 is of very short duration, such as for example, 10 microseconds. The base two 42 of unijunction transistor 28 is preferably connected to the DC supply through a temperature compensating resistor 44. Since the DC supply is obtained through the same source as the emitter voltage, large variations can occur in the line voltage without affecting the phase angle at which the voltage reference pulse is generated. The voltage reference pulse is fed to SCR 46 through gate circuit 14. The operation of gate 14 will be more fully described as this description proceeds.

The current sampling circuit 12 includes a resistor 48 which develops the current signal. As shown, the resistor 48 is connected in the line 20 which is being monitored. However, as will be understood, if the line current in the monitored line 20 is too great, resistor 48 may be connected to the secondary of a current transformer which is mounted on the monitored line 20. A pair of semiconductor diodes 50, 52 are preferably connected in parallel relation about resistor 48, as shown, to limit the voltage developed across the resistor 48. As will be understood, the voltage developed across resistor 48 is in phase with the line current being monitored.

Voltage from resistor 48 is stepped up by a transformer 54 and then applied to the base 56 of a transistor 58. Transistor 58 and a second transistor 60 are arranged, as shown, as an emitter coupled binary circuit which will change the current signal wave form from sinusoidal to rectangular. Transistors 58 and 60 also serve to determine the minimum current level at which reverse flow may be detected or sensed.

As above noted, the voltage pulses from the pulse generator 28 are fed to the SCR 46, through gate 14. Gate 14 is controlled by the transistor 60. When no current, or forward current, is passing through the transformer 54, the polarity is such that transistor 58 turns off and transistor 60 turns on. The voltage pulses are thus shorted by transistor 60, and do not feed SCR 46. When the current reverses, the polarity of transformer 54 is such that transistor 58 turns on, turning off transistor 60. Gate 14 is thus opened, allowing the voltage pulses from pulse generator 28 to trigger SCR 46, for every positive portion of the cycle.

The pulsating voltage from SCR 46 is smoothed by resistor 62, capacitor 64 and is fed to the base 66 of transistor 68. This turns on transistor 68, thus energizing relay 70. Resistor 62, capacitor 64 and transistor 68 are provided to obtain a time delay of approximately one second to avoid unnecessary switching on short duration reverse power flow. Diode 72 is provided to assure resetting of SCR 46, which resistor 74 is provided to give a holding effect and prevent chattering of relay 70.

When relay 70 is energized it closes contact 76 and opens contact 78, thus energizing relay 80. This will latch the controls in a power reverse position, as will be explained with reference to FIG. 2. When forward power again flows, relay 70 is deenergized, opening contact 76 and closing contact 78 to energize relay 82 and deenergize relay 80. This will again place the controls in a power forward position.

In the preferred embodiment, a selector switch 84 is provided. Selector switch 84 is provided with 4 positions. In the first position contacts 84a are closed, placing the detector and control circuit in an automatic mode. When in the second position, contacts 84b are closed turning the circuit off. In the third position contacts 84c are closed applying energy through closed contact 86 of relay 82 to light bulb 88. This provides an indication that the circuit is operating correctly in the forward mode. When switched to the fourth position, contacts 84d are closed. This will cause contact 86 to open and contact 90 of relay 80 to close, applying energy to bulb 92. This will provide an indication that the circuit is operating properly in the reverse mode. Thus by means of the selector switch 84, test positions may be provided to allow testing of the circuit to ensure that it is operating properly.

Referring now to FIG. 2, there is shown the control circuit for use with an electrical device, such as, for example, a voltage regulator. As will be understood, when the power flow reverses it is necessary to switch the automatic control of the regulator to a potential transformer on the source side of such regulator. In FIG. 2, the regulator automatic control is indicated by box 100 and the potential transformer by 102. In normal forward power condition relay 82 is energized (FIG. 1) and its contact 104 is closed. This allows energy to flow through relay 106 maintaining its contact 108 closed allowing energy to flow to controls 100. Resistor 110 and capacitor 112 are provided to give a delayed response to the operation of relay 106.

When power flow reverses, relay 82 is deenergized and relay 80 is energized, as previously explained. This will cause contacts 104 to open and contact 114 of relay 80 to close. As will be understood, when contact 104 opens, it will arc and it would be undesirable to connect the potential transformer to it during arcing. The delayed response of relay 106 is provided so that its contact 116 will not close until the arcing in contact 104 is extinguished. Of course, it will be apparent, that when switching from reverse flow condition to forward flow condition, the same action of relay 106 will prevent contact 108 from closing until arcing is extinguished in contact 114.

While there has been shown and described the present preferred embodiment of the invention, it will be clear to those skilled in the art that various changes may be made in the circuit detail without departing from the scope of the invention. As will be apparent, an output indication to provide an indication of reverse flow may be provided by utilizing the signal from the transistor 68 or the SCR 46 to drive other circuitry than the relay coil 70. Thus it will be apparent that changes may be made without departing from the spirit and scope of this invention.

What is claimed as new and which it is desired to secure by Letters Patent of the United States is:

1. A reverse power flow detector utilizing solid state components comprising:
   (a) a voltage sampling circuit for generating a voltage signal, said circuit including a voltage reference pulse generator connected to the power line to be monitored;
   (b) a current sampling circuit for generating a current signal,
   (c) an output circuit; and,
   (d) a single gate circuit operative between said voltage pulse generator and said output circuit, said single gate circuit comprising only one transistor;
      (1) said one transistor being turned on by a current signal indicating forward power flow to short out pulses generated by said pulse generator, preventing said pulses from activating said output circuit, and
      (2) said one transistor being turned off by a current signal indicating reverse power flow to allow pulses generated by said pulse generator to activate said output circuit.

2. A reverse power flow detector in accordance with claim 1 in which said voltage reference pulse generator is a unijunction transistor, the emitter of said unijunction transistor having means for connecting it to said power line, said means including a resistor-capacitor integrator circuit.

3. A reverse power flow detector in accordance with claim 2 in which said output circuit includes an SCR having its control gate connected to said pulse generator, said SCR control gate also being connected to said one transistor gate.

4. A reverse power flow detector utilizing solid state components comprising:
   (a) a voltage sampling circuit for generating a voltage signal, said circuit including a voltage reference pulse generator connected to the line to be monitored;
   (b) a current sampling circuit for generating a current signal;

(c) an output circuit;
(d) a gate comprising only one transistor operative between said voltage pulse generator and said output circuit,
  (1) said gate activated by a current signal indicating forward power flow to short all of said pulses generated by said pulse generator from activating said output circuit, and
  (2) said gate activated by a current signal indicating reverse power flow to allow pulses generated by said pulse generator to activate said output circuit.

5. A reverse power flow detector in accordance with claim 4 in which said voltage reference pulse generator is a unijunction transistor, the emitter of said unijunction transistor having means for connecting it to said power line, said means including a resistor-capacitor integrator circuit.

6. A reverse power flow detector in accordance with claim 5 in which said output circuit includes an SCR having its control gate connected to said pulse generator, said SCR control gate also being connected to said one transistor gate with said one transistor gate being operative to short all of said pulses from said pulse generator when said current signal indicates forward power flow so that said SCR is not activated by said pulses.

* * * * *